United States Patent [19]

Wichelt

[11] Patent Number: 5,442,527
[45] Date of Patent: Aug. 15, 1995

[54] LIGHTING CONTROL SYSTEM FOR TRACTORS

[75] Inventor: Kent M. Wichelt, Blue Grass, Iowa

[73] Assignee: New Holland North America, Inc., New Holland, Pa.

[21] Appl. No.: 318,411

[22] Filed: Oct. 5, 1994

[51] Int. Cl.[6] .............................................. B60Q 1/00
[52] U.S. Cl. ........................................ 362/61; 315/83; 362/802
[58] Field of Search ..................... 362/61, 251, 802; 315/82, 83

[56] References Cited

U.S. PATENT DOCUMENTS

| | | | |
|---|---|---|---|
| 4,464,604 | 8/1984 | Hillstrom et al. | 315/83 |
| 5,195,813 | 3/1993 | Brown | 362/61 |

*Primary Examiner*—Carroll B. Dority
*Attorney, Agent, or Firm*—Larry W. Miller; Frank A. Seemar

[57] ABSTRACT

A lighting control system for a tractor is disclosed wherein the various lights on the tractor are controlled through a pair of switch devices. The first lighting control switch is a rotary switch controlling the macro positions of the lighting operation from an off position to selected combinations of groups of lights on the vehicle. The second lighting control switch is operable to select individual lights within respective groups. The electronic instrument cluster upon which the lighting control switches are mounted includes a memory to store the last selected combination of selected individual lights to permit the same combination of lights to illuminate automatically whenever the main control switch is moved from the off position to the appropriate on position.

22 Claims, 2 Drawing Sheets

LIGHTING CONTROL SYSTEM FOR TRACTORS

BACKGROUND OF THE INVENTION

This invention relates generally to off-road motor vehicles, such as tractors, and more particularly, to a lighting control system for selecting the illumination of individual lights arranged around the perimeter of a tractor.

Off-road vehicle manufacturers, including the manufacturers of agricultural tractors, are faced with the problem of controlling the headlights and the working lights arranged around the perimeter of the tractor with switches that meet worldwide standards established to define appropriate specifications for the use and location of such lighting control switches. Such lighting switches should be easily understood and provide the operator with the flexibility of choosing the desired lighting arrangement for the particular task or operation being conducted. Such lighting control switches should be flexible enough to allow the operator to change easily the combination of lights being illuminated to correspond to the chosen task.

Agricultural tractors are typically provided with an instrument cluster containing gauges displaying the operation of the engine and other operative functions of the tractor. With the utilization of electronics, the instrument cluster is capable of receiving input from remote sensors and calculating pertinent information for the operator, such as the numbers of acres covered over an increment of time, through the use of a microprocessor which incorporates a nonvolatile memory for storing certain constants used in the calculations. This nonvolatile memory can be used various electronic functions and is available for use in conjunction with the lighting control system.

Accordingly, it would be desirable to provide a lighting control system that would provide a selective illumination of the various lights arranged around the perimeter of the tractor for different operative functions.

SUMMARY OF THE INVENTION

It is an object of this invention to overcome the aforementioned disadvantages of the prior art by providing a lighting control system that is operable to permit the selective illumination of various lights arranged around the perimeter of the tractor.

It is another object of this invention to provide a lighting control system in which the operator can select individual lights for illumination within a particular group of lights.

It is a feature of this invention that individual lights within the working light group can be selected for illumination to correspond to specific operative tasks being undertaken by the operator.

It is an advantage of this invention that individual lights within a particular group of lights that are not necessary for the selected operative function do not need to be illuminated.

It is another feature of this invention that any non-essential individual lights can be switched to the off position to prevent their respective illumination.

It is still another object of this invention to provide a lighting control system in which both groups of lights and individual lights within each respective group can be selected for illumination.

It is still another feature of this invention that the lighting control system includes a first switching mechanism that is operable to select groups of lights for illumination and a second switching mechanism that is operable to select individual lights within at least one of the respective groups of lights.

It is still another feature of this invention that the nonvolatile memory function of the electronic instrument cluster can be utilized to store the selected pattern of individual lights to be illuminated within a particular group of lights so that the re-illumination of that particular group of lights will automatically effect the illumination of the same previously selected pattern of lights.

It is another advantage of this invention that the combination of the second switching mechanism for selecting the illumination of individual lights within a particular group of lights with the utilization of the nonvolatile memory can allow the second switching mechanism to be utilized for different groups of lights selectable by the first switching mechanism.

It is yet another feature of this invention that a display can be incorporated into the instrument cluster to indicate the selection of lights for illumination.

It is still another advantage of this invention that the display provides a readily visible indication of the lights selected for illumination.

It is yet another object of this invention to provide a lighting control mechanism for an off-road vehicle which is durable in construction, inexpensive of manufacture, carefree of maintenance, facile in assemblage, and simple and effective in use.

These and other objects, features and advantages are accomplished according to the instant invention by providing a lighting control system for a tractor wherein the various lights on the tractor are controlled through a pair of switch devices. The first lighting control switch is a rotary switch controlling the macro positions of the lighting operation from an off position to selected combinations of groups of lights on the vehicle. The second lighting control switch is operable to select individual lights within respective groups. The electronic instrument cluster upon which the lighting control switches are mounted includes a memory to store the last selected combination of selected individual lights to permit the same combination of lights to illuminate automatically whenever the main control switch is moved from the off position to the appropriate on position.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION OF THE PREFERRED EMBODIMENT

Figure 1:
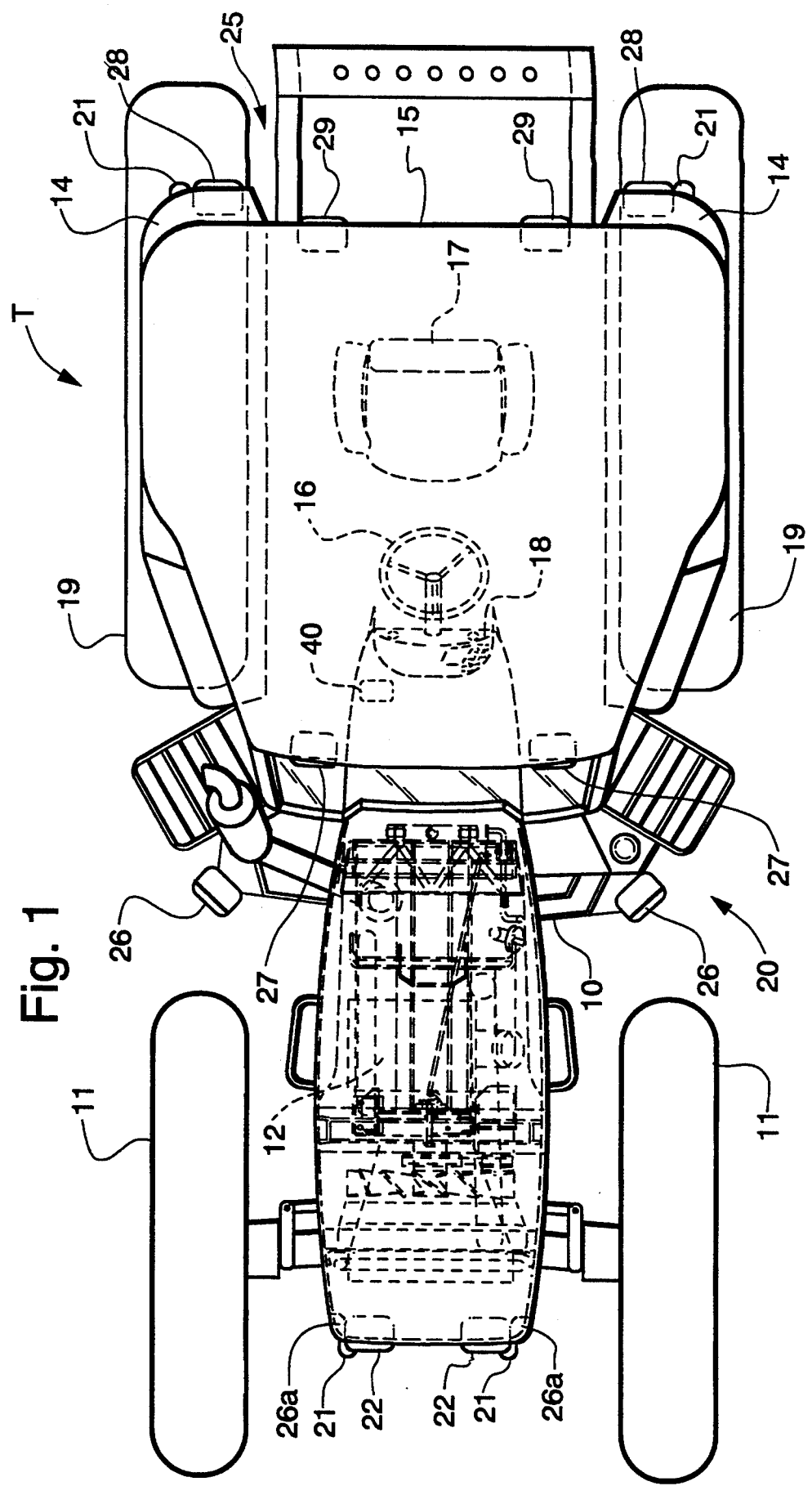
FIG. 1 is a top plan view of a tractor incorporating the principles of the instant invention, the operator's seat, steering wheel, instrument console, and engine being shown in phantom.
Figure 2:
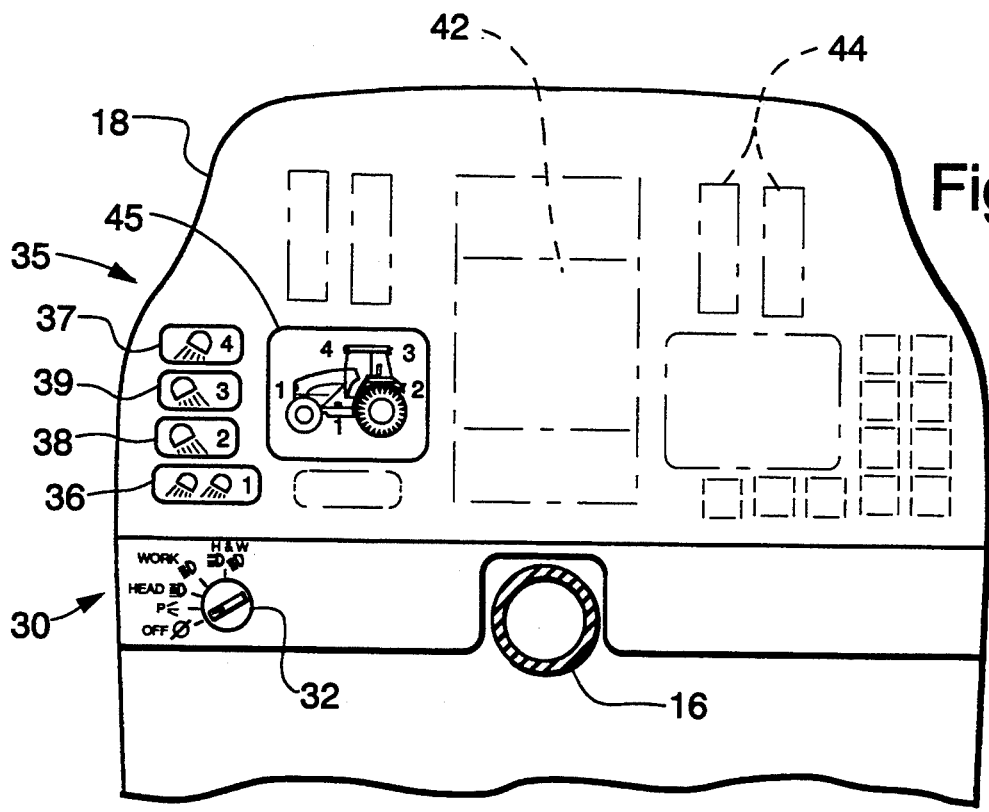
FIG. 2 is an enlarged partial detail view of the instrument console within the operator's cab to better depict the lighting control system incorporating the principles of the instant invention, the non-lighting control instruments being representatively shown in phantom.

Referring now to the drawings and, particularly, to FIGS. 1-4, a representative view of an agricultural tractor incorporating the principles of the instant invention can best be seen. Left and right references are used as a matter of convenience and are determined by standing at the rear of the tractor and facing the forward end in the normal direction of travel. The tractor chassis 10 is supported above the ground G in a conventional manner by forward steerable wheels 11 and rearward drive wheels 19 rotatably mounted in a customary transversely spaced orientation and houses a conventional engine 12 serving to provide operational power for the tractor T and an operator's cab 15 positioned in an elevated location. The operator's cab 15 includes a steering wheel 16, positioned forwardly of the conventional operator's seat 17, to operate the steering of the front wheels 11 in a known manner. An instrument console 18 is positioned forwardly of the steering wheel 16 within the full view of the operator seated in the operator's seat 17.

The perimeter of the tractor T is provided with a lighting system 20 comprising pairs of left and right disposed individual lights arranged around the periphery of the tractor T to provide appropriate illumination for various work tasks. The headlights 22 are positioned in a customary location at the front of the tractor T to provide illumination of the path of travel over which the tractor T is to move. Parking lights 21 are located at a conventional forward position on the chassis 10 below the headlights 22 and rearwardly on the fenders 14 covering the rear wheels 19. One skilled in the art will recognize that the location of the specific individual lights may vary from vehicle to vehicle and that the specific descriptions defined herein are meant to be representative.

The group working lights 25 are arranged on the tractor T to provide illumination to specific areas around the tractor T. Generally, the working lights 25 are multi-positionable, and can be directed toward any specific area within the normal range of movement of the individual light. The working lights 25 preferably include a pair of left and right lower front work lights 26, which are typically oriented to illuminate the ground adjacent the front wheels 11, and a laterally spaced pair of front hood work lights 26a, separate from the headlights 22, to illuminate the ground immediately in front of the wheels 11. The left and right upper front work lights 27 are often arranged in multiple sets and are typically used to illuminate a broad area in front of the tractor T. The upper front work lights 27 are particularly useful whenever front-mounted implements are used on the tractor.

The lower rear work lights 28 are typically mounted on the left and right fenders 14 and are used to illuminate the area immediately rearwardly of the tractor T. The lower rear work lights 28 are often utilized when towed or rear-mounted implements (not shown) are attached to the rear of the tractor so that the operation of the implement (not shown) adjacent the tractor T can be viewed. The upper rear work lights 29 are typically mounted to an upper portion of the operator's cab 15 to broadcast the light emanating therefrom over a greater distance. These upper rear work lights 29 are often mounted in multiples, although FIG. 1 only representatively depicts a pair of left and right lights 29, as is done with respect to the upper front work lights 27. The upper rear work lights 29 allow the operator to see the operation of a rearwardly positioned implement (not shown) at a distance greater than the range of the lower rear working lights 28.

The lighting control system 30 is located on the instrument console 18 so as to be positioned at the convenience of the operator. Typical instrument consoles 18 often incorporate electronic displays and usually include a microprocessor 40 to receive data from various sensors and display calculated information, such as wheel slip, acres covered, etc. Such microprocessors 40 have nonvolatile memories for storing constants and other information utilized by the microprocessor 40 in its operation. Information is made available to the operator through electronic displays 42 and push button controls for selecting different information or data to be displayed; however, analog gauges 44 could also be utilized on the instrument console 18 to provide appropriate information for the operator.

Figure 3:
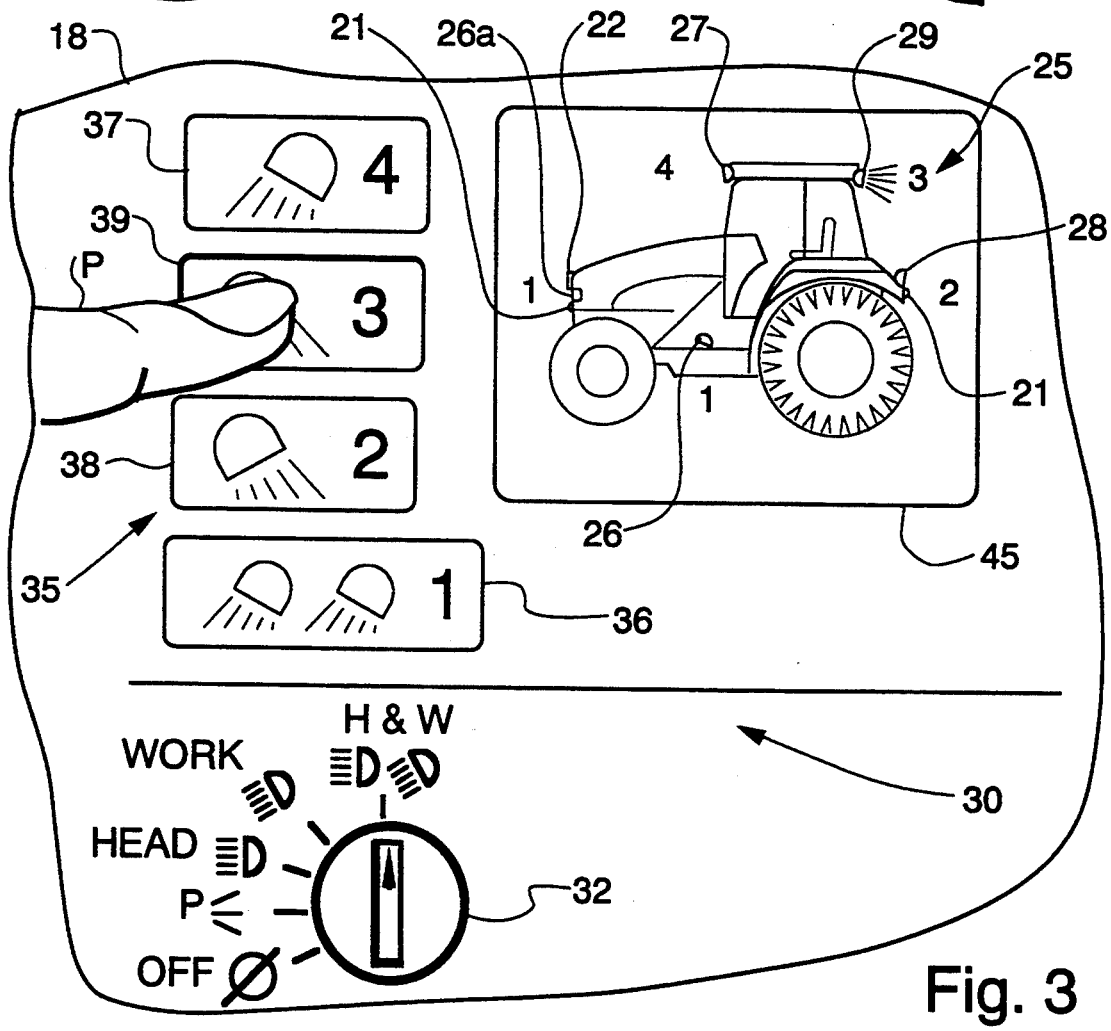
FIG. 3 is an enlarged partial detail view of the lighting controls forming a portion of the instrument cluster.

The lighting control system 30 includes a rotary switch 32 movable between a plurality of positions to illuminate groups of lights. As best seen in FIG. 3, the rotary switch 32 is rotatable between an off position in which all lights are turned off; a parking light position in which only the group of parking lights 21 on the tractor T would be illuminated; a headlight position in which only the group of headlights 22 are illuminated, although the group of parking lights 21 are typically illuminated in addition to the headlights 22; a working light position in which the group of working lights 25 can be illuminated; and a combination headlight and working light position in which all of the groups of lights 21, 22, 25 can be illuminated, the view of FIG. 3 showing the combination headlight and working light position as being selected.

The lighting control system 30 also includes a second switching mechanism 35 depicted as being positioned on the instrument console 18 above the rotary switch 32. The second switching mechanism 35 includes a plurality of individual switches 36, 37, 38 and 39 for selecting individual work lights 26, 26a, 27, 28 and 29 to be illuminated whenever the rotary switch 32 is turned to illuminate the group of working lights 25. Accordingly, the operator can select whichever of the work lights he chooses to be illuminated; however, the selected work light will not illuminate until the rotary switch has also be placed in either the working light position or in the combination headlight and working light position.

The lighting control system 30 can be operatively connected to the memory of the microprocessor 40 so that any selected combination of individual work lights 26-29 can be stored in the memory, such that the return of the rotary switch 32 to a position to illuminate the group of working lights from any other position, such as the off position, will automatically result in the illumination of the same previously selected combination of individual work lights 26-29. A display 45 depicting the profile of the tractor T with the lights indicated with LED's will indicate the working light selected for illumination.

As depicted in FIG. 3, the work lights depicted in the display 45 are number coded to correspond to the individual switch 36-39 controlling the respective illumination thereof. The operator P, as depicted in FIG. 3, has selected the upper rear work light 29 by depressing the switch 39. Accordingly, the rotation of the rotary switch 32 to the combination headlight and working light position, as also depicted in FIG. 3, will effect the illumination of the parking lights 21, the headlights 22 and only the upper rear work light 29 of the group of working lights 25. If the operator desires to cause additional work lights to be illuminated, he need only depress another of the individual switches 36, 37, 38 while the rotary switch 32 is in a position selecting the group of working lights 25.

The second switching mechanism 35 could be used also to select other combinations of individual lights corresponding to other selected positions of the rotary switch 32. For example, an additional individual switch (not shown) for the second switching mechanism 35 could provide separate on/off controls for the lower front work lights 26 and the front hood work lights 26a, instead of combining the operation of these work lights 26, 26a through a single switch 36, which has been found to be preferable to operators.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. In a tractor having a wheeled chassis adapted for movement over the ground; an engine supported on said chassis for providing operative power for said tractor; lights supported from said chassis at selected locations, said lights being grouped into a parking light group, a headlight group and a working light group; and an operator's station supported on said chassis for supporting controls for controlling the operation of said tractor, said controls including steering means for controlling the direction of movement of said tractor, engine control means for controlling the operation of said engine, lighting control means for controlling the illumination of said lights, and an instrument cluster containing displays reflecting the operation of said engine and said tractor, an improved lighting control means comprising:
   a first lighting switch means for controlling the illumination of groups of lights, said first lighting switch means being operable to select between an off position and a plurality of on positions, each of said on positions selecting the illumination of respective said groups of lights, at least one of said groups of lights including individual sub-groups of lights; and
   a second lighting switch means for selectively controlling the illumination of each respective said individual sub-group of lights within said at least one of said groups of lights, such that the movement of said first lighting switch means to select the illumination of said at least one group of lights will enable said second lighting switch means to select the illumination of each individual sub-group of lights within said at least one group of lights between corresponding on and off positions.

2. The tractor of claim 1 wherein said at least one group of lights comprises said working light group.

3. The tractor of claim 2 wherein said on positions for said first lighting switch means includes an on position for said parking light group, an on position for said headlight group, and an on position for said working light group.

4. The tractor of claim 3 wherein said second lighting switch means is operable to permit the selection of said individual sub-groups of lights within said working light group whenever said first lighting switch means is in said on position for said working light group.

5. The tractor of claim 4 further comprising a nonvolatile memory operative associated with said second lighting switch means to store the respective individual sub-groups of lights last selected for illumination so that a re-positioning of said first lighting switch means from said off position to a corresponding said on position will effect the illumination of the same individual sub-groups of lights last previously selected.

6. The tractor or claim 5 wherein said instrument cluster further includes a display indicating each respective said individual sub-group of lights selected for illumination by said second lighting switch means.

7. The tractor of claim 6 wherein said display indicates the lights illuminated whenever said first lighting switch means is in said one of said on positions.

8. The tractor of claim 7 wherein said memory stores the individual sub-groups of lights selected for illumination corresponding to each respective on position of said first lighting switch means.

9. The tractor of claim 8 wherein said first lighting switch means further includes an on position for illuminating both said headlight group and said working light group, said second lighting switch means being operable to permit the selection of individual sub-groups of lights within said working light group whenever said first lighting switch means is in said on position for the combination of said headlight group and said working light group.

10. The tractor of claim 9 wherein said first lighting switch means is a rotary switch and said second lighting switch means includes a plurality of individual switches corresponding to each individual sub-group of lights.

11. A lighting control system for a vehicle having a plurality of lights supported from said vehicle at selected locations, said lights being grouped into a parking light group, a headlight group and a working light group, comprising:
   a first lighting switch mechanism controlling the illumination of groups of lights, said first lighting switch mechanism being operable to select between an off position and a plurality of on positions, each of said on positions selecting the illumination of respective said groups of lights, at least one of said groups of lights including individual sub-groups of lights;
   a second lighting switch mechanism selectively controlling the illumination of each respective said individual sub-groups of lights within said at least one of said groups of lights, such that the movement of said first lighting switch mechanism to select the illumination of said at least one group of lights will enable said second lighting switch mechanism to select the illumination of each respective individual sub-group of lights between corresponding on and off positions; and
   a memory operatively associated with said second lighting switch mechanism to store the individual sub-groups of lights selected in said at least one group of lights for illumination, said memory being operable to illuminate the same individual sub-groups of lights previously selected each time said first lighting switch mechanism is moved to the corresponding on position from said off position.

12. The lighting control system of claim 11 wherein the on positions for said first lighting switch mechanism includes an on position for said parking light group, an on position for said headlight group, and an on position for said working light group.

13. The lighting control system of claim 12 wherein said second lighting switch mechanism is operable to permit the selection of respective individual sub-groups of lights for illumination within said working light group whenever said first lighting switch mechanism is in said on position for said working light group.

14. The lighting control system of claim 13 wherein said instrument cluster further includes a display indicating the individual sub-groups of lights selected for illumination by said second lighting switch mechanism.

15. The lighting control system of claim 14 wherein said first lighting switch mechanism further includes an on position for illuminating both said headlight group and said working light group, said second lighting switch mechanism being operable to permit the selection of individual sub-groups of lights within said working light group whenever said first lighting switch mechanism is in said on position for the combination of said headlight group and said working light group.

16. The lighting control system of claim 15 wherein said display indicates the lights illuminated whenever said first lighting switch mechanism is in said one of said on positions.

17. The lighting control system of claim 16 wherein said memory stores the individual sub-groups of light selected for illumination corresponding to each respective on position of said first lighting switch mechanism.

18. In a vehicle having a plurality of individual lights arranged around said vehicle, said lights being grouped into a parking light group, a headlight group and a working light group, an improved lighting control system for controlling the illumination of said lights comprising:

a first lighting switch mechanism controlling the illumination of said groups of lights, said first lighting switch mechanism being operable to select between an off position and a plurality of on positions, including an on position for said parking light group, an on position for said headlight group, an on position for said working light group, and an on position for illuminating both said headlight and said working light groups, each of said on positions selecting the illumination of the respective said groups of lights, said working light group including a plurality of individual sub-groups of lights;

a second lighting switch mechanism controlling the illumination of said individual sub-groups of lights within said working light group, such that the movement of said first lighting switch mechanism to select the illumination of said working light group will enable said second lighting switch mechanism to select the illumination of each respective individual sub-group of lights between corresponding on and off positions.

19. The vehicle of claim 18 further comprising a memory operatively associated with said second lighting switch mechanism to store the individual sub-groups of lights selected in said working light group for illumination, said memory being operable to illuminate the same individual sub-groups of lights previously selected each time said first lighting switch mechanism is moved to select the on position for said working light group from said off position.

20. The vehicle of claim 19 further comprising a display indicating the individual sub-groups of lights selected for illumination by said second lighting switch mechanism.

21. The vehicle of claim 20 wherein said memory stores the individual sub-groups of lights selected for illumination corresponding to each respective on position of said first lighting switch means.

22. The vehicle of claim 21 wherein said first lighting switch mechanism is a rotary switch and said second lighting switch mechanism includes a plurality of individual switches corresponding to each respective individual sub-group of lights.

* * * * *